United States Patent [19]
Tuck

[11] Patent Number: 5,975,911
[45] Date of Patent: Nov. 2, 1999

[54] MECHANICAL OSCILLOSCOPE

[76] Inventor: Norman Tuck, 379 25th Ave., San Francisco, Calif. 94121

[21] Appl. No.: 08/946,729

[22] Filed: Oct. 8, 1997

[51] Int. Cl.⁶ ............................. G09B 23/06; G09B 25/00
[52] U.S. Cl. ........................... 434/300; 434/402; 434/426
[58] Field of Search ..................................... 434/379, 402, 434/426, 300, 301, 302, 303

[56] References Cited

U.S. PATENT DOCUMENTS

| | | | |
|---|---|---|---|
| 2,446,047 | 7/1948 | Kent | 88/14 |
| 2,593,501 | 4/1952 | Thomas | 315/227 |
| 4,345,247 | 8/1982 | Thornton | 340/755 |

OTHER PUBLICATIONS

*Seeing Sound* by Sinston E. Koch, Wiley–Interscience Div. of John Wiley and Sons, New York, 1971, pp. VII–VIII, 8–18, 35–38, 78–89.
*Nasco Science '97*, science catalog #387, by Nasco Science Equip. Co., Modesto, Ca., 1997, pp. 314–315.
T. F. Harris, Handbook of Acoustics, pp. 37–39 J.Curwen and Sons, London, c. 1890's.

*Primary Examiner*—Robert A. Hafer
*Assistant Examiner*—John Edmund Rovnak

[57] ABSTRACT

A device which directly displays a steady state sinusoidal wave by positioning a scrolling pattern of alternating stripes (40 and 42) behind a flexible linear body comprising a vibrating rod (36) or string (50). The stripes (40 and 42) cover the outer surface of a moving body, which can be a rotating cylinder (20), spinning disk (74), or traveling belt (94) and are drawn perpendicular to the vibrating rod (36) or string (50). One set of stripes (40) is of a tonality that visually blends with the tonality of the vibrating element, and the alternate set of stripes (42) is of a tonality which contrasts with that of the vibrating element. Each respective stripe, therefore, either obscures or accentuates the segment of the vibrating element which is between it and the viewer. The viewer sees a solid wavy line in the form of a sinusoidal wave by observing the vibrating element with the stripes scrolling behind it. This device also displays the section of the shadow of the vibrating element which falls on the surface of the scrolling pattern as a solid wavy line in the form of a sinusoidal wave.

19 Claims, 5 Drawing Sheets

MECHANICAL OSCILLOSCOPE

BACKGROUND—FIELD OF INVENTION

This invention relates to optical devices, specifically to oscilloscopes which operate without electricity.

BACKGROUND—DESCRIPTION OF PRIOR ART

Science educators have used devices which display information, but these do not engage the student or hold their interest well. E.g., a variety of display devices are available which demonstrate aspects of wave theory, but they are difficult to use and understand.

Devices which aid in understanding music and sound are particularly desirable. Sound is produced by bodies oscillating at audio frequencies. Available devices do not provide an enjoyable way for students to learn about the relationship between oscillation and sound.

Electronic oscilloscopes are commonly used for displaying cyclic waves. They offer a very complex and indirect method of providing information about a sound producing body. The vibrating body first moves air to transfer its oscillation to the microphone. The microphone then translates the pulsating air into an electronic signal. Complex electronic circuitry then scans the electronic signal against time and finally sends a new signal to a display device. The display device displays the signal as a visible wave.

Electronic oscilloscopes are sophisticated instruments which must be operated by a knowledgeable individuals. Computers used as oscilloscopes are subject to the same disadvantages.

Stroboscopic disks are commonly used to analyze vibrating objects. They freeze the apparent motion of moving bodies. However, they do not translate motion into an observable wave form for analysis. Nor do they demonstrate the relationship between waves and vibration.

U.S. Pat. No. 2,446,047 to Kent (1948) uses a microphone to trigger a light which strobes a drum on which dark and light lines are drawn. This device may be used to determine the frequency of oscillations, however the device is expensive, cumbersome to use, and difficult to understand and therefore not suitable as a learning tool for untrained students.

U.S. Pat. No. 2,593,501 to Thomas (1952) shows another stroboscopic device. This device also utilizes a flashing light to strobe a body in motion. Like the other stroboscopic devices, this complex device operates by strobing rather than scanning.

U.S. Pat. No. 4,345,247 (1982) to Thornton shows a system for displaying a steadystate cyclic wave. This system graphically represents sound or similar vibration. However, this system entails an elaborate grouping of sophisticated electronic components and is cumbersome to use and difficult to understand.

The book "Seeing Sound", by Winston Koch, Wiley & Sons, 1971, describes several methods of visualizing sound. Each of these methods requires the use of complex electronic equipment.

Ripple tanks indirectly translate the actions of a vibrating body into visible waves. They are framed pieces of flat glass which contain liquid. A motorized vibrating body within the tank generates waves. An overhead light projects the wave images onto a screen below. Ripple tanks have many limitations and disadvantages. They don't directly analyze the source of the vibration. They require a great deal of space and an elaborate setup procedure. They are too awkward for use by the public in a museum situation. They display only subtle gradations of light.

Several display devices use granular powders placed on a flexible plate. The plates are made to vibrate by being bowed or struck. The powders then merge to reveal the nodal points between waves. The patterns that these devices display do not give much information for analysis.

The electric string vibrator is a popular classroom apparatus. It uses an electric motor to vibrate one end of a long string. At certain frequencies the vibrating string produces standing waves. This device only reveals the nodes between waves.

A strobe light and triggering device can be combined with the string vibrator. This combination displays a linear, cyclic wave pattern. The resulting apparatus is delicate, complex, and cumbersome. It requires a great deal of space and must be exhibited under restricted lighting conditions.

OBJECTS AND ADVANTAGES

Accordingly, several objects and advantages of my invention are:

(a) to provide a new, improved, simple, rugged, and inexpensive oscilloscope;

(b) to provide a method of examining waves that does not involve the use of a complex apparatus.

(c) to provide a method of examining wave forms which can be used by untrained students.

(d) to provide a method of examining wave forms which scans the a vibrating body.

(e) to provide a device that directly translates the motion of a vibrating body into an observable wave form.

Further objects and advantages of this invention are to directly display the action of a vibrating linear body as a series of visible steady state sinusoidal waves which can be used to analyze vibrations as they are produced by an actual sound source. This invention facilitates the examination and measurement of the frequency and amplitude of a vibrating linear body under a wide variety of lighting conditions and physical environments. The invention can be constructed and used by inexperienced students within a classroom to help understand the sound produced by a phonograph, radio or similar electronic device and to learn about the process of scanning and the phenomenon of persistence of vision. This invention can also be used to give a graphic depiction of the vibration pattern of any vibrating device by attachment of the linear body to that device. Most importantly this device is physically interactive, easy to understand and, therefore, fun to use. Still further objects and advantages will become apparent from a consideration of the ensuing description and drawings.

DRAWING FIGURES

Closely related figures have the same number but different alphabetical suffixes.

REFERENCE NUMERALS IN DRAWINGS 20 straight cylinder
22 axles
24 bearings
26 supports
28 platform
32 crank handle
34 flange
36 rod
38 light source
40 blending stripes
42 contrasting stripes
44 viewer
46 motor
48 frame
50 strings
52 microphone
54 sounding board
56 electronic transducer
58 transducer arm
60 electrical cables
62 electronic amplifier
64 clip
66 magnet
68 tachometer
70 calibrated scale
72 frame
74 disk
76 axle
78 bearings
80 brackets
82 blending stripes
84 contrasting stripes
86 rollers
88 axles
90 bearings
92 supports
94 belt
96 blending stripes
98 contrasting stripes

Figure 1A:
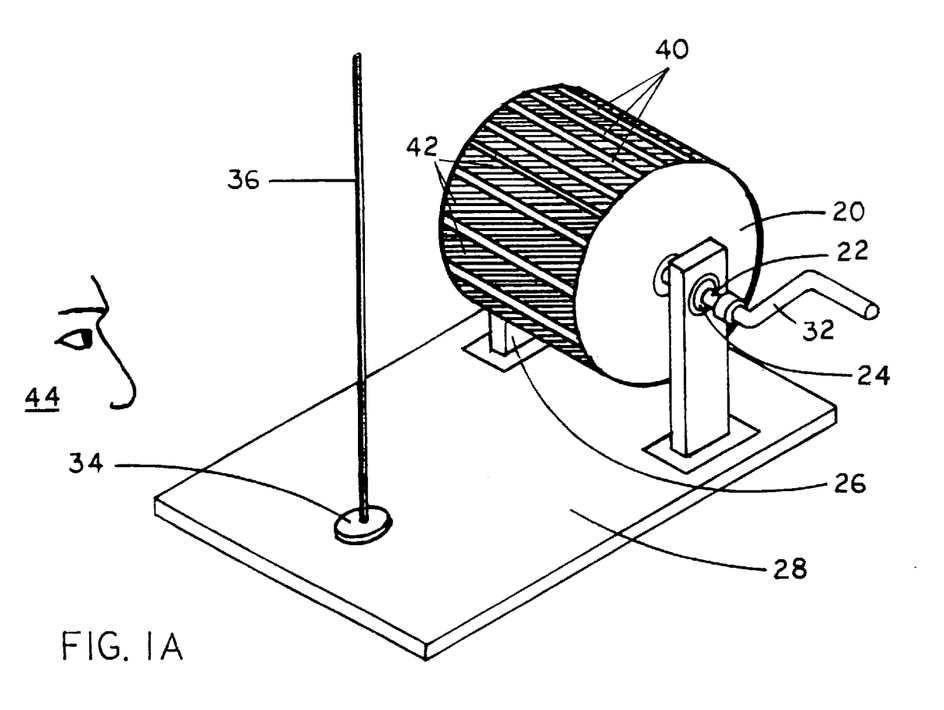
FIG. 1A shows a perspective view of an embodiment of a mechanical oscilloscope according to my invention with a flexible rod, a horizontal cylinder, and crank handle.

DESCRIPTION—FIG. 1A

FIG. 1 shows a perspective view of an embodiment of a mechanical oscilloscope according to my invention with a flexible rod, a horizontal cylinder, and a crank handle.

A straight cylinder, or drum 20, preferably about 20 cm. in diameter and 30 cm. long, has an attached axle 22 inserted at the cylinder's 20 central axis. Bearings or bushings 24 connect axle 22 to supports or brackets 26 which are attached to a platform or base 28 in that cylinder 20 and axle 22 are free to rotate. A crank handle 32 is directly one end of axle 22.

A flange or rod holder 34 is mounted onto platform 28 near the center of the curved wall of cylinder 20. Flange 34 holds one end of a flexible linear body comprising a thin rod or wire 36 made of a flexible material, such as steel, preferably 30 cm. long and 2 mm. in diameter, so that rod 36 stands perpendicular to axle 22.

A pattern made up of two different tones or colors of alternating stripes 40 and 42 covers the outer circumference of cylinder 20. Stripes 40 and 42 run parallel to axle 22. Stripes 40 should be of a tone or color which matches or blends with the tone or color of rod 36. Stripes 42 should preferably be narrower than stripes 40 and should be of a tone or color which contrasts with the tone or color of rod 36. Contrasting stripes 42 should preferably be no smaller than approximately 5 mm. and no larger than approximately 20 mm. wide and should be evenly distributed around the circumference of cylinder 20.

Viewer, student or participant 44 is positioned so that rod 36 is in the line of sight between viewer 44 and cylinder 20.

OPERATION—FIG. 1A.

The mechanical oscilloscope shown in FIG. 1 directly translates the motion of a vibrating body into visible steady state sinusoidal waves.

Flexible rod or wire 36 is mounted in the line of sight between viewer 44 and cylinder 20 so that rod 36 is observed with the curved wall of cylinder 20 in the background.

Alternating stripes 40 and 42 cover the outer circumference of cylinder 20 and run parallel to axle 22. Stripes 40 are of such a color or tonality that blends with the color or tonality of rod 36, in effect hiding, camouflaging, or obscuring that segment of rod 36 which is between stripe 40 and viewer 44.

Preferably narrower stripes 42 are of a color or tonality which contrasts with the color or tonality rod 36 which is placed in the foreground. Stripes 42 therefore accentuate, reveal, highlight, or profile that segment of rod 36 which is positioned between stripe 42 and viewer 44.

Viewer 44 plucks rod 36, making it vibrate or oscillate at its resonant frequency.

At the same time, straight cylinder 20 mounted on central axle 22 is driven to rotate by having viewer or participant 44 turn crank handle 32 attached to axle 22 at preferred speed of between 10 and 100 rotations per minute, depending on the rate of oscillation of rod 36 and the number of stripes 40 and 42. Cylinder 20 should be rotated at a speed such that at least one stripe 40 and one stripe 42 passes a point on rod 36 during each oscillation of rod 36.

With many stripes drawn on cylinder 20, this can be slower than 10 rotations per minute.

When vibrating rod 36 is observed by viewer 44 with striped cylinder 20 rotating in the background, the pattern of stripes scrolls behind rod 36. Surprisingly, viewer 44 observes a solid wavy line (as shown at 36 in FIG. 1B described below) along the length of rod 36 which is between viewer 44 and cylinder 20. This line is a graphic depiction of the motion of vibrating rod 36. The line is in the form of steady state sinusoidal wave. The line is the result of the "persistence of vision" phenomenon as stripes 42 scan along rod 36 as it oscillates.

Actively plucking and cranking while observing a mysterious phenomenon makes the device physically fun to play with. When experimentation is fun, learning is fun and the student remains accessible. Viewer 44 curiously seeks to understand how the image of the wavy line is created. As viewer 44 seeks to understand how the device works, he or she learns that waves describe an oscillating point in motion. This construct is basic to understanding wave theory.

The appearance of the solid wavy line is very unexpected. All of the elements of the mechanical oscilloscope are simple, solid, and apparent, yet the line is illusory and mysterious. There are no screens, shutters, or electronic components which would lead viewer 44 to expect to see an illusory image. The image of a sinusoidal wave that one is more mysterious and complex than the sum of the parts which make up the device.

The device is mentally challenging because the elements of the device are simple, yet the image displayed taxes understanding. The device challenges viewer 44 to explain the phenomenal image.

As viewer 44 experiments with the mechanical oscilloscope he or she discovers a great deal about the nature of waves. The device clearly shows that if the frequency of oscillation increases (i.e., if a shorter rod is substituted) the linear vertical distance between the peaks of the waves (the wave length) decreases. Viewer 44 can also observe that if rod 36 is plucked more violently the frequency remains constant while the horizontal distance between the peaks and the toughs of the waves of the wavy line increases. This horizontal distance between the peaks and troughs represents the amplitude of the wave.

The mechanical oscilloscope is an ideal example of a "hands on" teaching device. This type of device is highly regarded by science educators and science museums to motivate learning by direct experimentation.

The mechanical oscilloscope translates the oscillation of rod 36 as a steady state sinusoidal wave which can be observed, measured, or otherwise analyzed.

I believe that the theory of operation of the device (mechanical oscilloscope) is as follows: The sinusoidal wave appears as the contrasting stripes scan the vibrating body as the stripes scroll behind it. Each passing bright stripe displays the profile of a small segment of the oscillating body at the moment in which that stripe is behind that segment. The next passing bright stripe profiles the same segment in a similar position a moment later. Since the rod oscillates back and forth, the persisting, repeated images are perceived by the viewer as a solid wavy line in the form of a sinusoidal wave.

I believe also that when the cylinder rotates at a speed at which the displayed wave appears steady, the vertical distance between the observed peaks of the displayed wave is equal to the distance that the striped pattern has scrolled during the time period of one complete oscillation of the rod. I believe also that the horizontal distance between the peaks and trough of the displayed wave is equal to the amplitude of the oscillation of the rod. While I believe that the display is created in the above stated manner, I don't wish to be bound by this.

Figure 1B:
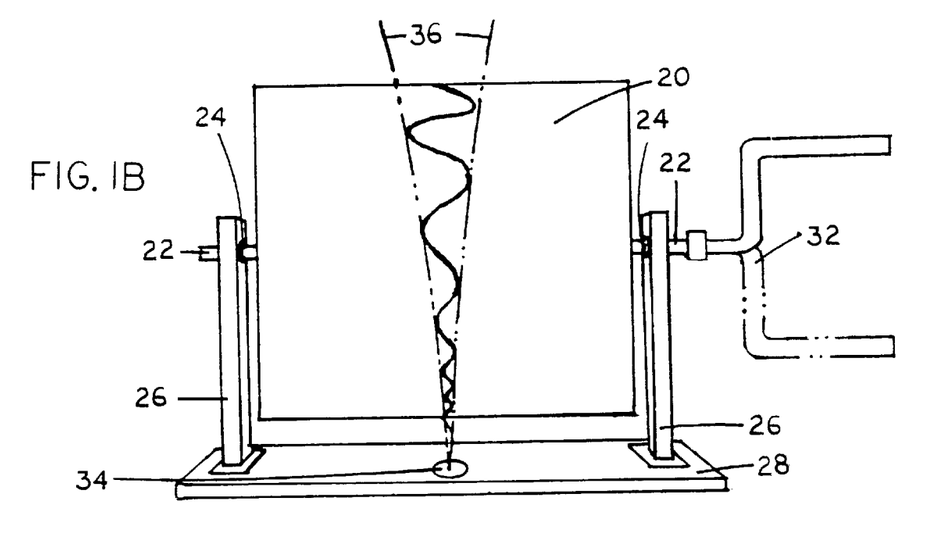
FIG. 1B shows a frontal view of an embodiment of the mechanical oscilloscope of FIG. 1A as it appears to the viewer while in operation.

DESCRIPTION—FIG. 1B

FIG. 1B shows a front view of the embodiment of the mechanical oscilloscope described in FIG. 1A as seen by viewer while the invention is actually in operation.

Cylinder 20 is mounted onto axle 22 which is attached via bearings 24 to supports 26 mounted onto platform 28. Cylinder 20 is shown rotating as it is cranked by crank handle 32 shown in two positions.

Flexible rod 36 is shown by phantom lines in two extreme positions as it oscillates from side to side after having been plucked by a viewer. Rod 36 is mounted on flange 34 which is positioned onto platform 28 between the viewer and cylinder 20 so that rod 36 is seen by the with rotating cylinder 20 in the background.

The wavy line shown between the two positions of rod 36 is the sinusoidal wave which appears to a viewer when the mechanical oscilloscope is in operation. Note that the distance between the peaks and troughs of the wavy line appear smaller at the top and bottom area of the line. The wave length appears shorter because stripes drawn on cylinder 20 appear closer together due to the effect of foreshortening of the top and bottom surface when cylinder 20 is viewed from a single vantage point.

Figure 1C:
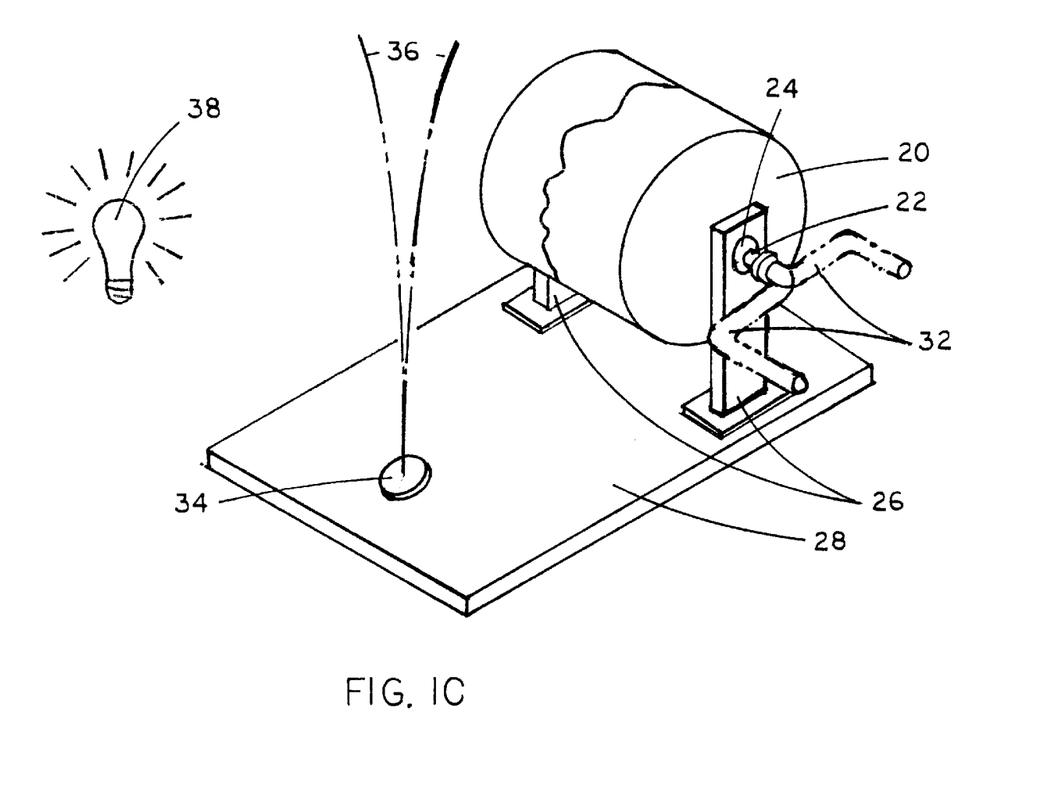
FIG. 1C shows a perspective view of an embodiment of the mechanical oscilloscope of FIG. 1A with a single light source, as it appears in operation.

DESCRIPTION—FIG. 1C

FIG. 1C shows a perspective view of an embodiment of a mechanical oscilloscope of the mechanical oscilloscope of FIG. 1A with a single light source, as it appears in operation.

Cylinder 20 is mounted onto axle 22 which is attached via bearings 24 to supports 26 mounted onto platform 28. Cylinder 20 is shown rotating as it is cranked by crank handle 32 shown in two positions.

A single light source 38 is shown preferably approximately 1 meter away from, and in front of the mechanical oscilloscope Flexible rod 36 is shown by phantom lines in two extreme positions as it oscillates from side to side after having been plucked by a viewer. Rod 36 is mounted on flange 34 which is positioned onto platform 28 between the single light source 38 and cylinder 20 so that the shadow of rod 36 is seen on the surface of rotating cylinder 20.

The wavy line shown on the surface of cylinder 20 is the shadow of oscillating rod 36. This shadow appears as a sinusoidal wave when the mechanical oscilloscope is in operation.

Figures 2A, 2B:
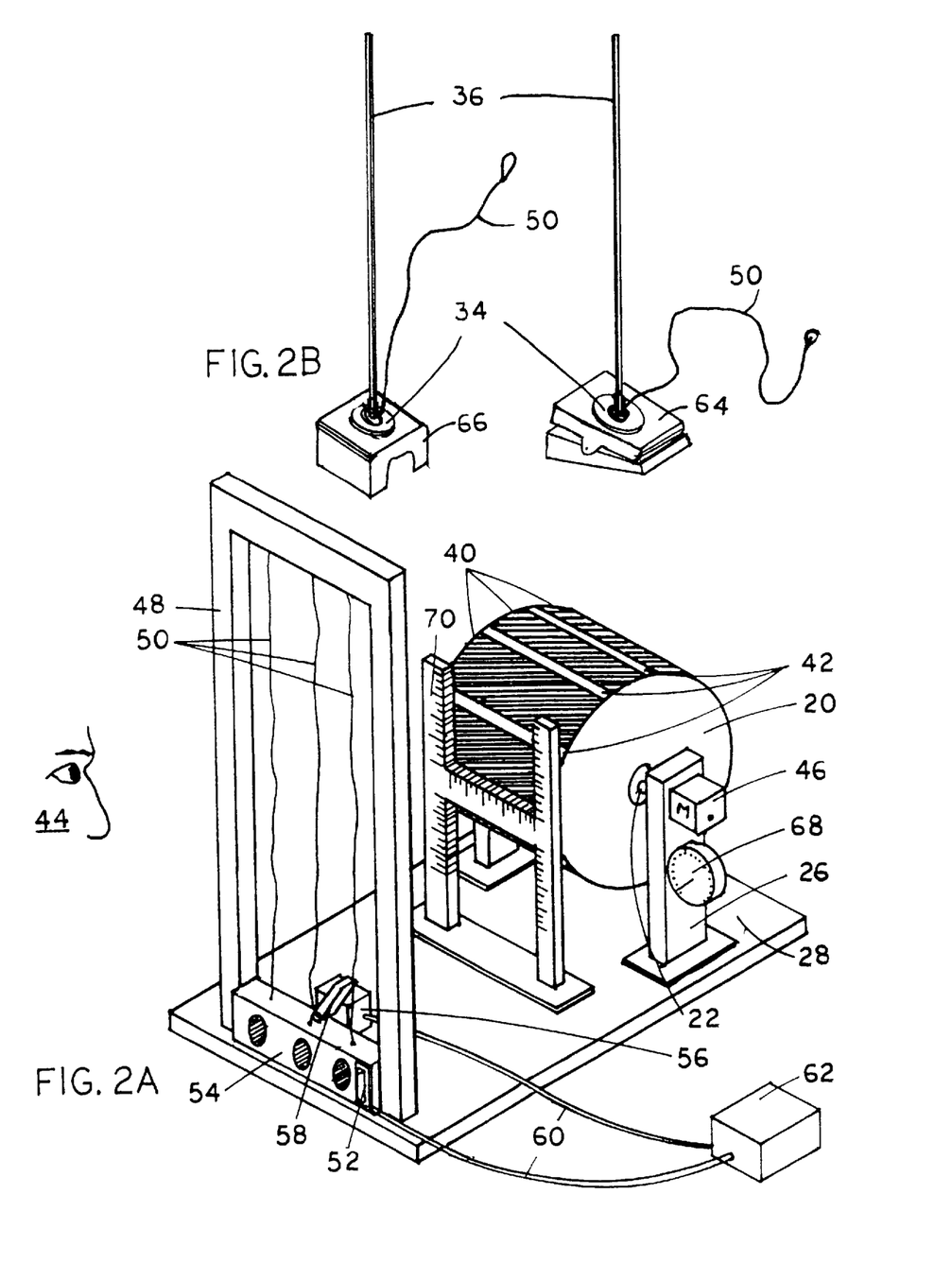
FIG. 2A shows a perspective view of an embodiment of the mechanical oscilloscope with a cylindrical drum, motorized drive, several stretched strings, and additions which enable the measurement of the frequency and amplitude of the waves.
FIG. 2B shows a perspective view of the linear bodies of FIG. 1A and 2A mounted onto a magnet and a clip for attachment to other devices.

DESCRIPTION—FIG. 2A.

FIG. 2A shows a perspective view of the embodiment of the invention shown in FIG. 1A with the substitution of a motorized drive for the hand crank. Also shown are additional oscillating linear bodies, and additions which enable the measurement of the frequency and amplitude of the waves.

A variable speed electric gear motor or engine 46 is mounted onto support 26 with shaft of motor 46 attached to axle 22.

Other additional features shown in FIG. 2A are metal frame 48 attached to platform 28. Each end of one or more flexible linear bodies comprising strings, wires, or cords 50 is attached to frame 48 in such a way that strings 50 are positioned perpendicular to axle 22 between cylinder 20 and viewer 44 and under slight tension. Strings 50 are of the same coloration and tonality as blending stripes 40.

String 50 may be placed near a microphone or electronic pick-up 52 or attached to acoustical sound board 54.

An electronic transducer 56, such as a speaker, solenoid, or galvanometer may be mounted onto platform 28 with movable element or transducer arm 58 in contact with string 50. Electrical wires or cables 60 connect transducer 56 to an electronic radio, phonograph, or electronic amplifier 62.

Tachometer 68 is linked to axle 22. Calibrated ruler or scale 70 is mounted onto platform 28.

OPERATION—FIG. 2A

The operation of the mechanical oscilloscope of FIG. 2A is identical to that described in FIG. 1A with the following additions.

Electric motor 46 is utilized to cause the rotation of cylinder 20 so that cylinder 20 no longer needs to be manually cranked.

Also, string, wire, or cord 50 which is stretched within an attached metal frame 48 may be manually plucked or bowed by the viewer so that it vibrates or oscillates. The action of string 50 is then translated into a displayed sinusoidal wave pattern, similar to that described in the operation in FIG. 1A and FIG. 1B.

Vibrating string 50 may be placed near microphone or electronic pickup 56 so that the sound of its vibration may be amplified and heard. The sound of string's 50 vibration may also be acoustically amplified by attachment to sounding board or box 54.

The mechanical oscilloscope very effectively motivates experimentation by students when string 50 directly produces sound. In this configuration the directness between the sound heard and the wave displayed is unequaled by any existing device.

An alternative to plucking is to utilize an electronic transducer 56, such as a speaker, solenoid, or galvanometer mounted on platform 28 with the movable element or arm 58 of transducer 56 in contact with string 50. When transducer 56 is linked to electronic amplifier 62 string 50 is driven to vibrate in a compliance with an electronic signal, such as a recorded music. Viewer 44 then observes a graphic visual depiction of the music or sound being sampled.

Viewer 44 can utilize the mechanical oscilloscope to determine the frequency of vibration of string 50 in the following manner.

Viewer 44 controls the motor to accelerate cylinder 20 until the sinusoidal waves appear steady and constant. At that point viewer 44 should note the reading in revolutions per minute on the tachometer and multiply this by the number of contrasting stripes 42 drawn on cylinder 20. Viewer 44 then divides this number by 60 to determine the frequency of vibrating rod 36 in cycles per second.

Viewer 44 can also utilize calibrated scale 70 mounted on platform 28 to measure the amplitude of the vibration of the linear body. The distance between the left-hand and right-hand peaks of the sinusoidal wave being observed, when measured using calibrated scale 70, represents the amplitude of the vibrations of the linear body.

DESCRIPTION—FIG. 2B

FIG. 2B shows rods 36 or strings 50 attached to clothes pin type spring clip 64 or magnet 66.

OPERATION—FIG. 2B

FIG. 2B shows string 50 and rod 36 mounted onto clip 64 and magnet 66. Clip 64 and magnet 66 allow rod 36 or string 50 to be easily attached to any vibrating device, such as an engine or vibrator so that their movement is transferred to rod 36 or string 50. The movement of the device is then graphically analyzed by the operation of the mechanical oscilloscope placed behind the oscillating string 50 or rod 36, as described in FIGS. 1A, 1C, and 2A.

Figure 2C:
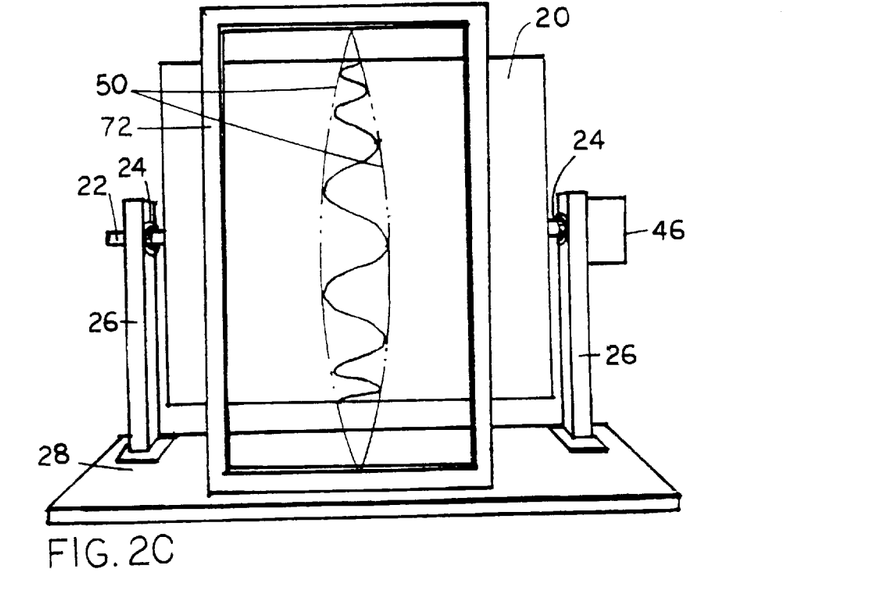
FIG. 2C shows a frontal view of a simplified version of the embodiment shown in FIG. 2A as it appears to the viewer while in operation.

DESCRIPTION—FIG. 2C

FIG. 2C shows a frontal view of a simplified version of the embodiment of the mechanical oscilloscope described in FIG. 2A as seen by viewer 44 while the mechanical oscilloscope is actually in operation.

Cylinder 20 is mounted onto axle 22 which is attached via bearings 24 to supports 26 mounted onto platform 28 which is mounted onto platform 28. Cylinder 20 is shown rotating as it is powered by motor 46.

String 50 is stretched from the top to the bottom of frame 72 which is positioned onto platform 28 between the viewer and cylinder 20 so that string 50 is seen by the with rotating cylinder 20 in the background. String 50 is shown by phantom lines in two extreme positions as it oscillates from side to side after having been plucked by a viewer.

The wavy line shown between the two positions of string 50 is the sinusoidal wave which appears to a viewer when the mechanical oscilloscope is in operation. Note that the distance between the peaks and troughs of the wavy line appear smaller at the top and bottom area of the line. The wave lengths appear shorter because stripes drawn on cylinder 20 appear closer together due to the effect of foreshortening of the top and bottom surface when cylinder 20 is viewed from a single vantage point.

Figure 3:
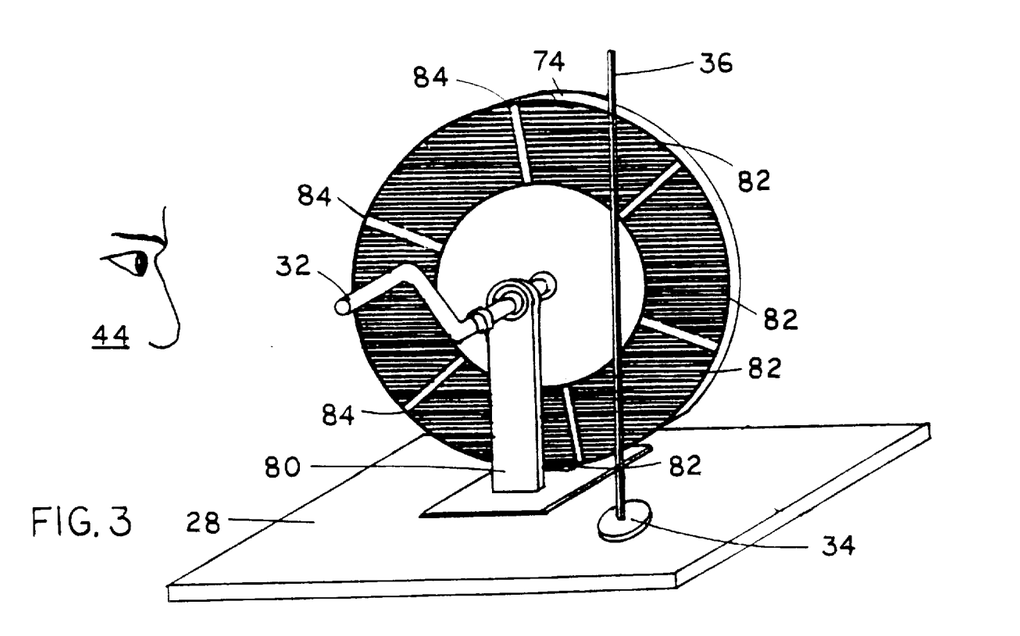
FIG. 3 shows a perspective view of an embodiment of the mechanical oscilloscope with a flat disk, a crank handle, and a flexible rod.

DESCRIPTION—FIG. 3

FIG. 3 shows a perspective view of an embodiment of the mechanical oscilloscope utilizing a flat disk.

In FIG. 3 a flat disk 74 is attached to axle 76 with the flat side facing viewer 44. Axle 76 is attached via bearings 78 to brackets 80 which are mounted onto platform 28. Disk 74 is positioned so that its outer area is seen behind rod 36.

Stripes 82 and 84 are drawn on disk 74 to radiate from the center. Crank handle 32 is attached to the front of axle 76.

OPERATION—FIG. 3

In FIG. 3 the operation of the mechanical oscilloscope is identical to that described for FIG. 1A, except that a flat disk 74, with the stripes 82 and 84 drawn radially from the center of the disk 74, is substituted for the cylinder 20 shown in FIG. 1A. Disk 74 is turned by viewer 44 via the crank handle 32 so that the striped pattern scrolls and is observed in a manner similar to that described for FIG. 1A.

Figure 4:
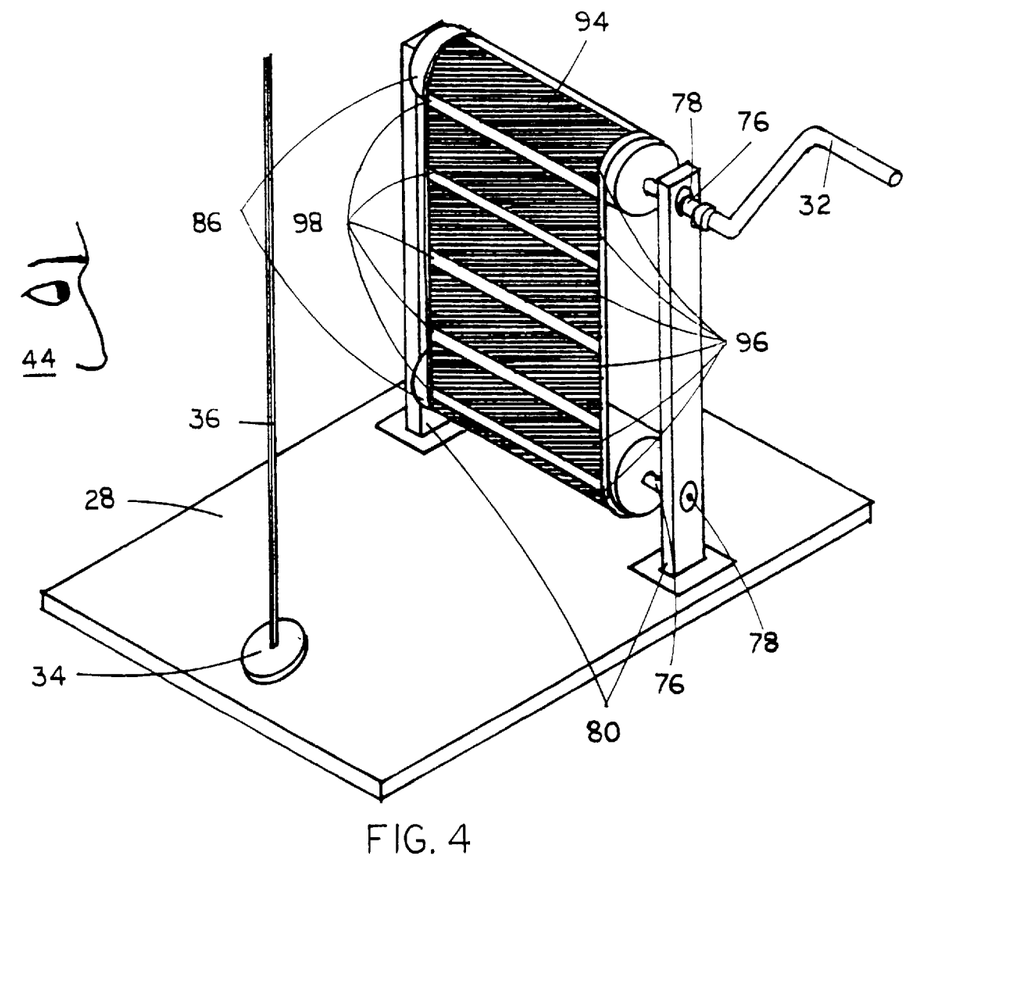
FIG. 4 shows a perspective view of an embodiment of the mechanical oscilloscope with a flexible rod, a crank handle, and a flexible belt.

DESCRIPTION—FIG. 4

FIG. 4 shows a perspective view of an embodiment of the mechanical oscilloscope utilizing a traveling belt.

In FIG. 4 two rollers 86 are attached to axles 88 mounted on bearings 90 positioned on supports 92. Cylindrical flexible belt, apron, or band 94 is stretched between rollers 86. Belt 94 is positioned so that it is seen behind rod 36.

Crank handle 32 is attached to the end of one of axles 88 and blending stripes 96 and contrasting stripes 98 are drawn across the belt 94 from one side to the other.

OPERATION—FIG. 4

In FIG. 4 the operation of the mechanical oscilloscope is identical to that described for FIG. 1A, except that cylindrical flexible belt, band, or apron 94, which has stripes 96 and 98 drawn on it from one side to the other, is stretched between two rollers 86. When one of rollers 86 is turned via the crank handle 32 the striped pattern drawn on belt 94 scrolls and is observed in a manner identical to that described in FIG. 1A and 1C.

CONCLUSION, RAMIFICATIONS, AND SCOPE

The mechanical oscilloscope directly translates the motion of a vibrating body into visible sinusoidal waves. It can be used as a teaching device to demonstrate wave theory. It can also function as an entertainment device or public display. Furthermore, the mechanical oscilloscope has the additional advantages that

* it demonstrates the concept of scanning.
* it demonstrates the phenomenon of persistence of vision.
* it combines simple and familiar elements to produce a surprising display.
* it can be built and maintained by relatively unskilled workers or students.
* it can be constructed of common and inexpensive materials.
* it operates under available light.
* it is "hands on" and physically interactive, especially when hand cranked.
* it does not require electricity an outside power source.
* it directly translates sound into a visible waves.
* it directly gives a corresponding visual component to music produced by one or a (group of plucked or bowed strings.
* it can facilitate the measurement of the frequency of vibration of a linear vibrating body when provided with a tachometer.
* it can facilitate the measurement of the amplitude of the vibrations of a linear vibrating body.
* it provides a graphic depiction of the vibration pattern of any vibrating device if a linear body is attached to the device.
* it theory of operation is intellectually intriguing.

Although the description above contains many specificities, these should not be construed as limiting the scope of the invention, but as merely providing illustrations of some of the presently preferred embodiments. Other embodiments and variations are possible. For example the mechanical oscilloscope can include a harp-like musical instrument in which the strings create a musical display, mirrors can replace the contrasting stripes so as to project the sinusoidal waves onto a screen, an attachment can be included which can produce a sound at each rotation of the cylinder so that the number of rotations can be counted, dimensions, materials, arrangement, etc. can be changed.

Thus, the scope of the invention should be determined by the appended claims and their legal equivalents, rather than the examples given.

I claim:

1. A display system, comprising:
    a flexible linear body comprising at least a portion of a body selected from the group consisting of strings, cords, and wires and being capable of vibrating the flexible linear body comprising
    a first end,
    a second end,
    a direction of elongation, and
    a predetermined coloration;
    a surface adjacent the flexible linear body having a pattern of two sets of alternating stripes of predetermined width comprising a first set of stripes of a similar coloration to said flexible linear body so as to obscure segments of said flexible linear body, and
    a second set of stripes of a contrasting coloration to said flexible linear body so as to accentuate segments of said linear body,
    wherein each of said first and second set of stripes has a length substantially perpendicular to the direction of elongation of said flexible linear body;
    first fixing means for fixing the first end of the flexible linear body:
    second fixing means for fixing the second end of the flexible; and
    means for causing said surface to move in a direction substantially parallel to the direction of elongation of said flexible linear body,
    wherein a sinusoidal wave is displayed when said flexible linear body is vibrated and said surface is moved in the direction substantially parallel to the direction of elongation of said flexible linear body.

2. The display system of claim 1, further comprising an external light source positioned adjacent the flexible linear body so that the shadow of said flexible linear body is displayed as a sinusoidal wave on said surface when said linear body is vibrated and said surface travels in the direction substantially parallel to the direction of elongation of said flexible linear body.

3. The display system of claim 1, wherein said surface is a cylinder having an outer circumference and an axis, said first and second set of stripes being provided on the outer circumference of said cylinder, parallel to said axis of said cylinder, and said cylinder is spaced apart from said flexible linear body with its axis perpendicular to the direction of elongation of said flexible linear body, and wherein the means for causing said surface to move comprises means for rotating said cylinder about its axis.

4. The display system of claim 1, wherein said surface is a flat disk and said stripes are drawn radially from the center of said flat disk, and said disc being positioned so that the center of said disk is spaced from said linear body and a radius of said disk is perpendicular to said linear body, and further including a means for causing said disk to rotate.

5. The display system of claim 1, wherein said surface as a flexible continuous band having two edges, said stripes are drawn perpendicular to the edges of said band, and said band is mounted on a plurality of rollers spaced from said linear body with the edge of said band parallel to said linear body, and further include means for causing said rollers to rotate so that said stripes travel in a direction perpendicular to said linear body.

6. A display device, comprising;
    a flexible linear body comprising at least a portion of a body selected from the group consisting of strings, cords, and wires, the flexible linear body having a first end a second end, a direction of elongation, and a color;
    a surface having a pattern positioned adjacent to and spaced apart from said flexible linear body, said pattern including a plurality of parallel spaced lines of a predetermined width and length, said length drawn perpendicular to said flexible linear body, at least one of said lines being of a color to blend with the color of said linear body and at least one of said lines being of a color to contrast with the color of said flexible linear body;
    first fixing means for fixing the first end of the flexible linear body;

second fixing means for fixing the second end of the flexible linear body; and means for causing said surface to travel in a direction substantially parallel to the direction of elongation of said flexible linear body, wherein a sinusoidal wave is observed when said linear body is vibrated and said surface travels in the direction substantially parallel to the direction of the flexible linear body.

7. The display device of claim 6, further comprising an external light source positioned so that the shadow of said flexible linear body is displayed as a sinusoidal wave on said surface when said linear body is vibrated and said surface travels in the direction substantially parallel to the direction of elongation of the flexible linear body.

8. The display device of claim 6, wherein said surface is a cylinder having an outer circumference and an axis, said stripes being provided on the outer circumference of said cylinder, the lengths of said stripes being parallel to said axis of said cylinder, and said cylinder is spaced apart from said flexible linear body with its axis perpendicular to said flexible linear body, and wherein the means for causing said surface to move comprises means for rotating said cylinder on its axis.

9. The display device of claim 6, wherein said surface is a flat disk and said stripes are drawn radially from the center of said flat disk, said disc being positioned so that the center of said disk is spaced from said linear body and a radius of said disk is perpendicular to said linear body, and further including a means for causing said disk to rotate.

10. The display device of claim 6, wherein said surface as a flexible continuous band having two edges, said stripes are drawn perpendicular to the edges of said band, and said band is mounted on a plurality of rollers spaced from said linear body with the edge of said band parallel to said linear body, and further including means for causing said rollers to rotate so that said stripes travel in a direction perpendicular to said linear body.

11. The display system of claim 1, further comprising:

at least one additional flexible linear body comprising at least a portion of a body selected from the group consisting of strings, cords, and wires and being capable of vibrating said additional flexible linear body comprising a first end, a second end a direction of elongation, and a predetermined coloration:

at least one additional first fixing means for fixing the first end of said additional flexible linear body, and at least one additional second fixing means for fixing the second end of said additional flexible linear body, wherein the display system comprises a plurality of flexible linear bodies.

12. The display system of claim 11 wherein each of said plurality of flexible linear bodies has a different tension such that when the plurality of flexible linear bodies are vibrated each flexible linear body produces a different audible tone.

13. The display system of claim 11 wherein each of said plurality of flexible linear bodies has a different thickness such that when the plurality of flexible linear bodies are vibrated each flexible linear body produces a different audible tone.

14. The display system of claim 11 wherein each of said plurality of flexible linear bodies has a different length such that when the plurality of flexible linear bodies are vibrated each flexible linear body produces a different audible tone.

15. The display system of claim 1 wherein at least one end of the flexible linear body is connected to means for acoustic amplification comprising a hollow body.

16. The display device of claim 6 further comprising a base, wherein the cylinder is mounted to the base, and a bottom end of the flexible linear body is attached to the base.

17. The display device of claim 8 further comprising means for measuring a rate of rotation of the cylinder about its axis.

18. The display device of claim 17 wherein the means for Measuring a rate of rotation comprises a tachometer.

19. The display device of claim 6 wherein at least one end of the flexible linear body is connected to means for acoustic amplification comprising a hollow body.

* * * * *